United States Patent [19]

Frerichs

[11] Patent Number: 4,922,983

[45] Date of Patent: May 8, 1990

[54] VEHICLE WHEEL AND TIRE ASSEMBLY

[75] Inventor: Udo Frerichs, Langenhagen, Fed. Rep. of Germany

[73] Assignee: Continental Aktiengesellschaft, Hanover

[21] Appl. No.: 337,963

[22] Filed: Apr. 14, 1989

[30] Foreign Application Priority Data

Apr. 15, 1988 [DE] Fed. Rep. of Germany ....... 3812492

[51] Int. Cl.$^5$ ...................... B60B 21/10; B60C 15/02
[52] U.S. Cl. .................................. 152/379.3; 152/380; 152/DIG. 20
[58] Field of Search ............... 152/379.3, 379.5, 381.4, 152/380, 387, DIG. 20

[56] References Cited

U.S. PATENT DOCUMENTS 1,885,484 11/1932 Shoemaker ................. 152/DIG. 20
1,903,575  4/1933 Shoemaker ................. 152/DIG. 20

FOREIGN PATENT DOCUMENTS 3000428  7/1981 Fed. Rep. of Germany .
3621849  1/1988 Fed. Rep. of Germany .
2198094  6/1988 United Kingdom ............ 152/379.3

Primary Examiner—Russell D. Stormer
Attorney, Agent, or Firm—Robert W. Becker & Associates

[57] ABSTRACT

A combination of a pneumatic tire and a vehicle wheel. The wheel has a rigid rim provided with essentially radially inwardly extending rim flanges. The radially outer side of the rim has emergency operation support surfaces, and the radially inner side of the rim is provided with respective recessed mounting portions for the beads of the tire, which is made of rubber or rubber-like synthetic material and has a carcass that is anchored in the beads by being looped about pull and compression-resistant bead cores thereof. The beads are disposed on rim seating surfaces provided on the radially inner side of the rim next to the rim flanges. The height of the rim flanges and the configuration of the tire beads are coordinated with one another in such a way that when the tire is uninflated and not subjected to load, there is provided between a rim flange and an adjacent inner wall of the tire, at the level of the radially innermost point of the rim flange, a gap of 0.5 to 3 mm.

4 Claims, 1 Drawing Sheet

VEHICLE WHEEL AND TIRE ASSEMBLY

BACKGROUND OF THE INVENTION

The present invention relates to a combination of a pneumatic tire and a vehicle wheel, where the wheel has a rigid rim that is provided with essentially radially inwardly extending rim flanges, with the rim furthermore being provided, on its radially outer side, with support surfaces for operation in an essentially uninflated state of the tire, and, on its radially inner side, with respective recessed mounting portions for the beads of the tire, which is made of elastomeric material, i.e. rubber or rubber-like synthetic material, and has a carcass that is anchored in the tire beads by being looped about pull and compression-resistant bead cores thereof, with the beads being disposed on rim seating surfaces provided on the radially inner side of the rim next to the rim flanges.

Vehicle wheel and tire assemblies of this general type are disclosed, for example, in German Offenlegungsschrift No. 30 00 428 and German Offenlegungsschrift No. 36 21 849. Such wheel and tire assemblies are characterized by a high driving comfort and by favorable emergency operation characteristics when, for example, a flat tire is encountered. Due to the arrangement of the tire beads on the radially inner periphery of the rim, the rim flanges are disposed in the interior of the tire, so that the sidewalls of the tire can spring or deflect inwardly in an unobstructed manner, and can bulge laterally outwardly.

The tire beads rest against the rim in essentially three areas, namely on the radially inner seating surfaces of the rim ring, against the perpendicular faces of the rim flanges, and against the radially inner surfaces of the rim flanges. Due to the carcass forces that act at the bead cores, radially inwardly directed forces as well as pivot moments are generated at the tire beads; these forces must be absorbed at the three aforementioned seating surfaces on the rim. It is sometimes not easy to optimally select the proportions for these seating surfaces relative to the overall bead seat on the rim. These difficulties increase even more due to the unavoidable tolerances encountered during the mass production of rims and tires.

To resolve the indicated problems, German Offenlegungsschrift No. 36 21 849 proposed the use of an annular and/or disk-shaped support body for absorbing radial forces and pivot moments of the bead at the radially inner surface of the bead, at least in the axially inner region, with this support body being centered relative to the axis of rotation of the rim at non-resilient portions of the vehicle wheel. However, this solution requires a further component in the form of the annular or disk-shaped support body, and furthermore centering means must be provided on the rim.

It is therefore an object of the present invention to provide an improved bead seat in a more straightforward manner.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The inventive combination of a pneumatic tire and a vehicle wheel is characterized primarily in that the height of each rim flange and the height or configuration of each tire bead are coordinated with one another in such a way that when the tire is uninflated and not subjected to load, there is provided between the rim flange and an adjacent inner wall of the tire, at the level of the radially innermost point of the rim flange, a gap of 0.5 to 3 mm.

The chief advantage of the present invention is that a double seating or fit at the rim seating surface and at the sealing surface against the rim flange is avoided.

Further specific features of the present invention will be described in detail subsequently.

DESCRIPTION OF PREFERRED EMBODIMENTS

Figure 1:
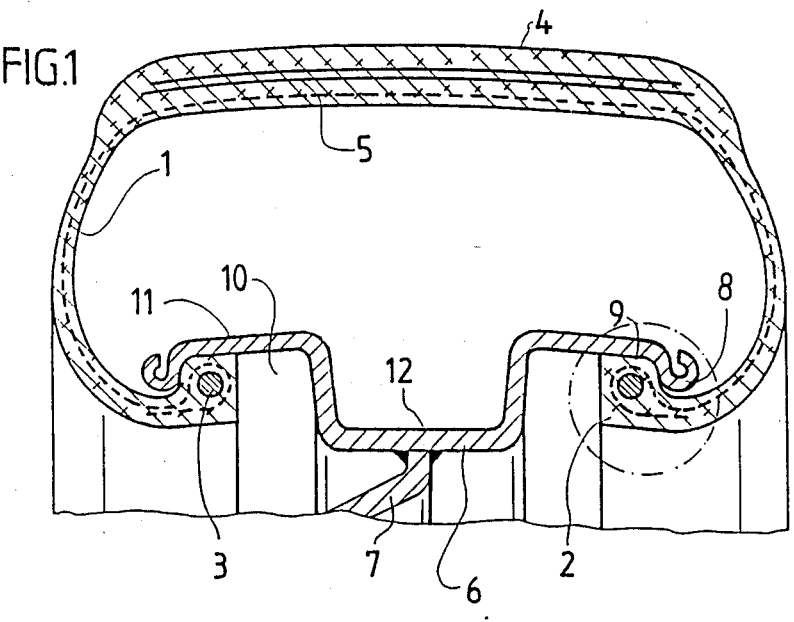
FIG. 1 is a partial radial cross-sectional view through one exemplary embodiment of the inventive vehicle wheel and tire assembly in an uninflated state of the tire.

Referring now to the drawing in detail, the pneumatic tire used with the vehicle wheel and tire assembly of FIG. 1 is essentially made of rubber or rubber-like synthetic material, and has a radial carcass 1 that is anchored in the beads 2 by being looped around pull and compression-resistant bead cores 3. Disposed between the tread 4 and the radial carcass 1 is a conventional reinforcing belt 5. The one-piece rim 6, which is embodied as a so-called shoulder or high-wing deep bed rim (see German Offenlegungsschrift No. 30 00 428), is secured to a rim dish 7. On each laterally outer side, the rim 6 has a respective rim flange 8 that extends essentially radially inwardly, and that serves in a conventional manner to hold the tire bead 2 upon the rim 6. Disposed next to each rim flange 8 is a rim seating surface 9 that in the case of rims for passenger automobiles is inclined by approximately 5° relative to the axis of rotation of the rim; the tire beads 2 rest directly against the rim seating surfaces 9. Disposed axially inwardly of each tire bead 2 is a respective recessed mounting portion 10, the average diameter of which is greater than the largest diameter formed by the rim seating surfaces 9. The radially outer portions of the rims 6 form support surfaces 11 for flat tire operation or otherwise for driving without air pressure in the tires; the support surfaces 11 are divided into two partial surfaces by a radially outwardly disposed drop center 12 of the rim 6.

Figure 2:
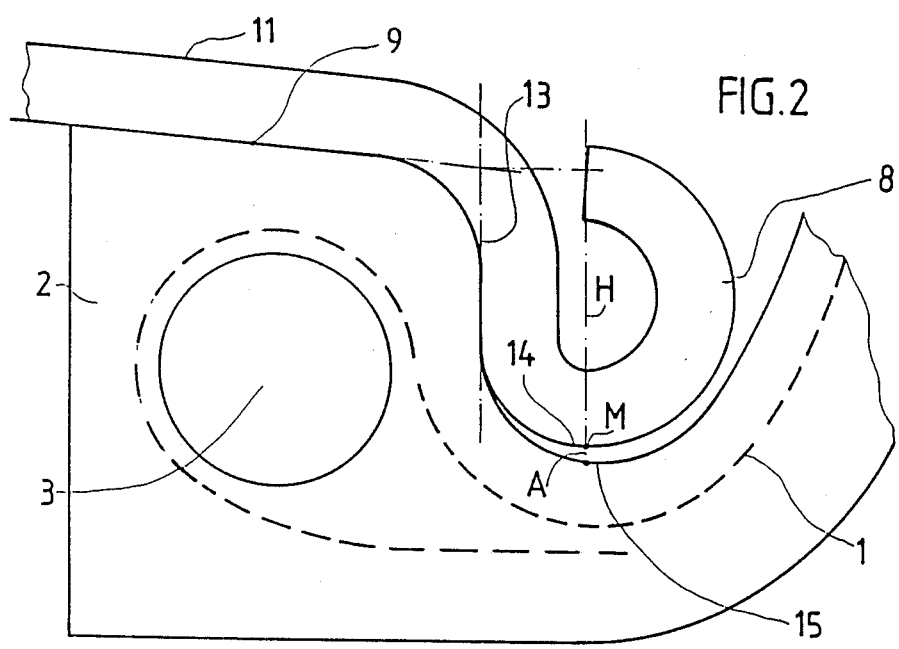
FIG. 2 is an enlarged view of the dot-dash encircled portion of the wheel and tire assembly of FIG. 1.

FIG. 2 is an enlarged view of the dot-dash encircled portion of the vehicle wheel and tire assembly of FIG. 1. The tire bead 2 rests directly against the rim seating surface 9 as well as against the axially inner surface 13 of the rim flange 8, whereas a space or gap A exists between the radially inner surface 14 of the rim flange 8 and the adjacent inner wall 15 of the tire. In the case of tires for passenger cars, at the level of the radially innermost point M of the rim flange 8, the gap A is 0.5 to 1.5 mm, preferably 0.5 to 1.0 mm. In the case of tires for trucks, the gap A can be up to 3 mm. The tire bead 2 is to be designed in such a way that the gap A exists after the tire has been mounted, while it is still uninflated and before it is subjected to a load. During inflation to 0.3 bar, the gap A changes only slightly. As the inner pressure increases, the carcass forces increase, the surface 15 of the tire gradually rests against the surface 14 of the rim flange 8, and assumes an additional sealing function at operational tire pressure.

In the uninflated state of the tire, the distance between the surface 14 of the rim flange 8 and the surface 15 of the tire gradually decreases from the point M in an axially inward direction, with the surface 15 running approximately tangentially into the surface 14. For vehicle wheel and tire assemblies for passenger cars, and in the embodiment illustrated in FIG. 1, the rim flange height H is 11 mm. In this connection, the height H is determined by first obtaining the line of intersection between the rim seating surface 9 and the axially inner surface 13 of the rim flange 8, and then projecting the radially innermost point M of the rim flange 8 upon this line, which, as clearly shown in FIG. 2, extends parallel to the axis of rotation of the rim.

It should be noted that with the described design of the tire bead 2, the radially outer surface of the bead rests against the rim seating surface 9 either without any pressure or with a defined contact pressure.

The present invention is, of course, in no way restricted to the specific disclosure of the specification and drawing, but also encompasses any modifications within the scope of the appended claims.

What I claim is:

1. In a combination of a pneumatic tire and a vehicle wheel, where said wheel has a rigid rim that is provided with essentially radially inwardly extending rim flanges, and with said rim furthermore being provided, on its radially outer side, with support surfaces for operation in an essentially uninflated state of said tire, and, on its radially inner side, with respective recessed mounting portions for the beads of said tire, which is made of rubber or rubber-like synthetic material, and which has a carcass that is anchored in said tire beads by being looped about pull and compression-resistant bead cores thereof, with said tire beads being disposed on rim seating surfaces provided on the radially inner side of said rim next to said rim flanges, the improvement wherein:
   each of said rim flanges has a height that is coordinated with the configuration of one of said tire beads in such a way that when said tire is uninflated and not subjected to load, there is provided between said rim flange and an adjacent inner wall of said tire adjacent said bead thereof, at the level of a radially innermost point of said rim flange, a gap of 0.5 to 3 mm.

2. The combination of claim 1, in which, in the case of a passenger car, said gap is in the range of from 0.5 to 1.5 mm.

3. The combination of claim 2, in which said gap is 0.5 to 1.0 mm.

4. The combination of claim 2, in which said rim flange height is 11 mm.

* * * * *